Patented Oct. 16, 1951

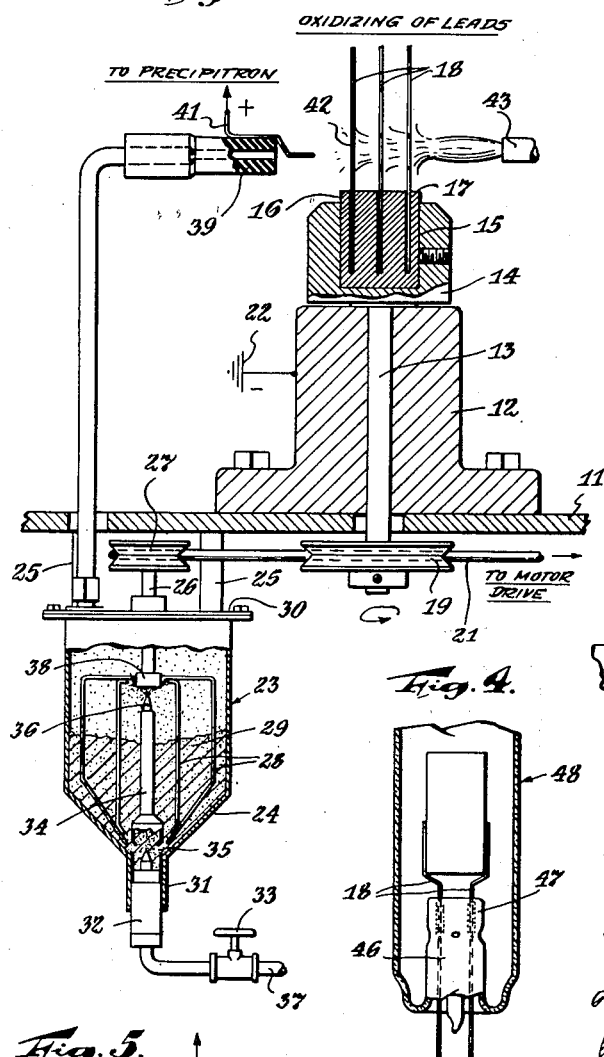

2,571,608

UNITED STATES PATENT OFFICE 2,571,608

METHOD AND APPARATUS FOR CONNECTING ARTICLES WITH A GRADED COATING OF GLASS

Vernon L. Plagge, East Orange, N. J., assignor to Westinghouse Electric Corporation, East Pittsburgh, Pa., a corporation of Pennsylvania Application June 29, 1945, Serial No. 602,259

6 Claims. (Cl. 49—81)

1

This invention relates to applying coatings of glass to metal and glass articles, as for the purpose of uniting such articles, as well as uniting metal or glass articles to other metal or glass articles of different compositions.

The principal object of my invention, generally considered, is to apply coatings of glass of the desired character to metal, as well as glass, surfaces preliminary to uniting glass to metal and/or glass or metal to glass and/or metal.

Another object of my invention is to apply coatings of glass to metal or glass surfaces, in which the coating glass is first prepared by crushing, grinding, forming into a smoke, charging said smoke to a potential different from that of the article to be coated, whereby the glass particles in said smoke stick to said article, and fusing the coating of glass on said article.

A still further object of my invention is to prepare a graded seal by bringing the outlets from two generators of a glass smoke, or gaseous suspension of finely-divided glass, to a single nozzle, said generators respectively containing glass of different compositions, and the outlets therefrom being independently controllable by valves, so that the composition of the glass smoke delivered from the common nozzle may vary from that of one generator gradually to that of the other, thereby making it possible to apply coatings of desired composition, as well as changing the character of said coatings at will during coating operations.

Other objects and advantages of the invention will become apparent as the description proceeds.

Referring to the drawing:

Fig. 1 is an elevational view, partly in vertical section, of apparatus for practicing my invention.

Fig. 2 is a view corresponding to a part of Fig. 1, but showing a subsequent step in which a plurality of wires, to function as leads, are being coated with powdered glass.

Fig. 3 is a view corresponding to Fig. 2, but showing the next step in which powdered glass coatings are being fused to cause them to firmly adhere to the wires.

Fig. 4 is a vertical sectional view, partly in elevation, of a discharge device in which wires, beaded in accordance with Figs. 1 to 3, have been incorporated.

Fig. 5 is a fragmentary view of apparatus for generating glass "smoke" of a controlled character.

Fig. 6 is a fragmentary longitudinal sectional

2 view of a discharge device which may be made using the generator of Fig. 5.

Fig. 7 is a view corresponding to Fig. 6, but showing a modification.

Referring to the drawing in detail, like parts being designated by like reference characters, and first considering the embodiment of my invention illustrated in Figs. 1, 2 and 3, there is shown a table or support 11 to which is secured a pedestal 12, through which extends a shaft 13 journalled therein, having a head 14 at its upper end provided with an upwardly opening pocket 15 which receives a block 16 having a plurality of upwardly opening sockets 17 for receiving metal wires 18.

The lower end of the shaft 13 carries a pulley 19 engaged by belt 21 from a suitable drive motor, not shown in order to cause rotation of the head 14 and wires 18 carried thereby. The pedestal 12 is desirably grounded, as indicated at 22, although as an alternative it may be insulated from the table 11 and maintained at a desired potential.

The reference character 23 designates a "smoke" generator, which may correspond structurally with that designated 36 in the McGowan application, Ser. No. 445,246, filed May 30, 1942, and now abandoned. However, in this instance, the "smoke" is to be made from powdered glass, rather than fluorescent material. For that purpose, the glass is prepared in any desired manner, which will secure very fine particle size. As an example, a standard glass which will match the expansion of the wires, or other articles to be coated with glass, is selected and crushed to small size. The crushed glass is then ground, as in a ball mill, for a relatively long period of time, such as at least 12 hours, to a particle size of less than 100-mesh, and preferably less than 200-mesh.

The powdered glass is then deposited in the housing 24, of the smoke generator 23, which is suspended from the table or support 11 as by means of brackets 25. It may carry a drive motor connected to a shaft 26 journalled in the housing cover 30, or said shaft may carry a pulley 27 driven in any suitable manner, as by means of the belt 21. To the lower end of the shaft 26 are secured stirring wires or the like 28, at least partially submerged in the finely-divided glass 29 in the housing 24, whereby operation of the shaft effects a continuous stirring of the powdered glass.

The lower portion of the housing 24 is desirably frusto-conical in shape and terminates in a spout or cylindrical projection 31, receiving the end of an air nozzle 32, connected thereto in any desired manner, as in the McGowan application referred to. The air from the nozzle is controlled by suitable means such as valve 33. Said nozzle fits in a pipe 34, the lower portion of which is relatively large and provided with apertures 35, while the upper portion is reduced in section to a nozzle tip, as indicated at 36.

By virtue of this construction, compressed air may be admitted to the housing through air hose 37, to blow the agitated glass particles 29 which feed through the apertures 35, through the upper end of the reduced section 36, to impinge against the hub 38 of the stirring wires 28, thereby generating an air suspension of said finely divided glass, making a smoke, and delivering it to a nozzle 39, preferably formed of insulating material and carrying an electrode 41 adapted to be charged to a relatively-high preferably positive potential.

The method of using the apparatus previously described may be as follows. A plurality of wires 18 are placed in corresponding sockets 17 of the supporting block 16, where they are rotated upon operation of a drive motor, or other operating means. In the present embodiment, the wires 18 are adapted for leads for electrical device, and shown as formed in three parts, the center parts being of "Kovar" or other material which seals well through glass. Instead of "Kovar," I may use tungsten, molybdenum, dumet, as disclosed in the Fink Patent No. 1,498,908, or other selected lead-wire material. The end portions of the leads may be of copper, or other selected material, connected to the center portions by butt welds.

The intermediate portions of the leads are oxidized while being rotated, as by subjecting them to the flame of a gas burner 43 until the oxide thereon is just enough to roughen the wire surface, while being capable of absorption by the glass coating to be applied thereto. In other words, the surface to be coated with glass is oxidized or otherwise roughened, that is, by acid or sand-blasting, as more specifically disclosed in the Pask et al. application, Ser. No. 591,998, filed May 4, 1945, now Patent No. 2,560,593, and owned by the assignee of the present application.

After the leads are sufficiently roughened or oxidized, as illustrated in Fig. 1, the burner 43 is removed or shut off, and the valve 33 adjusted to discharge the selected smoke 44 in a stream on the intermediate portions 42 of the leads 18, while they are still rotated, the axis of such rotation being substantially perpendicular to the line of direction of said stream, as shown most clearly in Fig. 2. During this operation, the electrode 41 is charged to a high preferably positive potential, such as about 9000 volts, thereby giving the glass particles which flow thereover a high electrostatic charge and causing them, for that reason, to be attracted to the oppositely charged, relatively negative, or grounded leads 18, to build up a coating of powdered material to the desired thickness.

When this has been accomplished, the valve 33 is shut off and the burner 43 brought into position, as illustrated in Fig. 3, to fuse the coating of powdered glass to firmly adherent films or beads 45 on the leads 18, or the intermediate portions thereof, as shown most clearly in Fig. 3, as by heating to the correct temperature for a suitable time interval. Heating for about four minutes at about 1000° C. has been successfully used. These beaded leads may now be used in vacuum or other electrical devices to form parts of mounts 46, for example, as shown in Fig. 4, where a pair of beaded leads 18 are shown incorporated in the press 47 of the mount 46, forming part of a discharge device 48, only one end of which is illustrated. The glass coating on the leads, of any thickness desired, from one to ten mils, for example, either forms a graded seal between the leads and the glass of the press, if of material having expansion characteristics intermediate those of the leads and press glass, and/or insures against leakage along said leads.

The foregoing description is applicable to coating conductive or metal articles, such as wires, where it is possible to ground the article being coated or charge it to a potential different from that of the glass particles forming the coating. When a glass or non-conductive article is being coated, the same may be effectively grounded, or charged to a potential different from that of the glass particles by heating to a point where it becomes conducting. As an alternative, a plate or film of conductive material may be applied back of the surface to be coated, and grounded or charged to a potential different from that of the glass particles, the conductive plate or film thereby causing the latter to adhere to the non-conductive surface in a similar manner.

Referring now to the embodiment of my invention illustrated in Fig. 5, there is shown a pair of smoke generators 23ª and 23ᵇ, corresponding with the generator 23 of the preceding embodiment, and supplied with compressed air from air hose 37ª, which branches and through separate valves 33ª and 33ᵇ connects with the generators 23ª and 23ᵇ respectively. The outlet pipes 49 and 51 from said generators are respectively controlled by valves 52 and 53, which may be independently operated, or their operating handles 54 and 55 connected by a rod 56, so that as one valve, 52, for example, initially open, is being closed while valve 53, initially closed, is being opened.

By virtue of this arrangement, it is possible to put powdered glass, having a certain expansion characteristic, in one of the generators, and powdered glass of a different expansion characteristic, in the other generator, and deposit glass from the smoke generated, which may be directed by the pipes 49 and 51 to common discharge pipe 57 which goes from there to a nozzle like that designated 39 in the preceding embodiment, on leads or any other surface which it is desired to coat, as in the preceding embodiment.

During the process of coating, the composition of the smoke may be changed, by gradually closing one valve 52 and opening the other valve 53, so that the first coating deposited may, for example, have an expansion characteristic corresponding with that of the surface on which deposited, the expansion characteristic of said coating being gradually changed as it is built up, until the last layer of powdered glass has a different expansion characteristic which may correspond with that of the glass or other material to which the coated wire, or other object, is to be united, thereby creating a uniformly-varying graded seal between metal and glass, metal and metal, or glass and glass, as the case may be.

As an alternative, as when the expansion characteristics of the parts to be united are not greatly different, one generator may contain glass having an expansion characteristic making it properly sealable to one of the parts to be united, but of expansivity intermediate those of the two parts, and the other may contain powdered glass of the expansivity intermediate that of the glass of the other generator and that of the other part, but satisfactorily sealable to the latter. Then the first part may be provided with a coating of glass from one generator, and the second part with a coating of glass from the other generator, and the two coated parts subsequently sealed together by the graded seal thus provided. As a further alternative, one of the parts may have a coating of glass from one generator, said glass being then fused thereon and then a coating of glass is applied from the other generator and fused thereon, whereupon it is sealed to another part, the layers of glass having expansion characteristics making a properly graded seal between the two parts.

Fig. 6 illustrates a product of the apparatus and method described in connection with Fig. 5. The reference character 58 designates an envelope for a discharge device, and the reference character 59 designates a support or lead for an electrode 61 thereof. The lead 59 is coated with glass 62, as from generator 23ª which has characteristics making it seal properly to the material thereof and, if different, desirably approaching the expansion characteristics of the material forming the envelope 58. After this coating of powdered glass has been fused on the wire, as described in connection with the first embodiment, a second coating 63 is applied thereover, this being from generator 23ᵇ which contains glass properly sealable to that from generator 23ª, and having expansion characteristics making it also properly sealable to the material forming the envelope 58, as by being, if different in expansivity, intermediate that of the material of the first coating and that of the envelope. After this second coating has been fused on the first coating, the beaded lead 59 is then sealed to the envelope, forming a graded seal as illustrated in Fig. 6.

Fig. 7 illustrates a construction similar to Fig. 6, except that the envelope 58ª is connected to the lead 59ª carrying the electrode 61ª, by beading 64 formed by starting the application of a coating from smoke from the generator 23ª, containing glass sufficiently matching the expansion characteristics of the lead 59ª, and gradually varying the smoke composition, as by use of the connecting rod 56 between the valve handles 54 and 55, to add more and more glass from the generator 23ᵇ, which matches the material of the envelope 58ª, while decreasing the proportion of the glass admixture from the generator 23ª, whereby the bead 64 provided on the lead 59ª has an inner portion properly matching the expansion of the lead 59ª, an intermediate portion gradually varying in expansion characteristics from those of the lead 59ª, to an outer surface portion having expansion characteristics sufficiently corresponding with those of the envelope 58ª to form a proper graded seal between the united parts. Upon the application of this gradually varying coating and, fusing it on the lead as described in the first embodiment, said beaded lead may then be connected to the envelope 58ª in accordance with conventional practice.

From the foregoing, it will be seen that I have not only provided for conveniently applying a bead or coating of glass to a wire, or any other desired article, but have made it possible to conveniently vary the expansion characteristics of such coatings, whereby a wire or other object may be satisfactorily united to another wire, or other object such as a glass envelope, by a conveniently-formed graded seal.

In the past this has been done by a succession of layers of glass, which form a series of expansion steps. Many times the glasses are not available for the intermediate steps, and in other cases the cost of performing these operations is exorbitant. In accordance with my method, by using two smoke generators, if containing powdered glasses whose expansion characteristics are at the ends of expansion range desired to be bridged, I am enabled to conveniently unite two objects, whether they be both metal, both glass, or one metal and one glass, by a series of glasses in either definite steps or through imperceptible gradations.

The glass employed for coating depends on the expansion characteristics of the article to be coated. Any of the common glasses used for beading, in connection with making glass to metal seals, may be employed. When the wire or lead is made of tungsten, for example, I may use any one of Corning glasses Nos. 772, 3320, and 775. When made of "Kovar" as defined in the Lempert et al. Patent No. 2,279,831, for example, or molybdenum, for example, I may use either of Corning glasses Nos. 704 and 7052. When it is desired to apply glass to glass or other non-conductive surface, the glass from which the powder is made may be made of the same kind of glass as that of the article to be coated, or one modified by the addition of another glass, to make a graded seal with respect to another article of glass, or a metal article to which the glass is to be connected.

Corning glass No. 704 is a potash-borosilicate glass containing a small percentage of alumina. It is sold under the trade mark "Pyrex," laboratory No. G-705-BA, for radio special sealing. It has a softening point at $702+7°$ C., an annealing point at 484° C., a strain point at 450° C., a coefficient of expansion of $47.5 \pm 1.5 \times 10^{-7}$ between 0 and 300° C., a working point at approximately 1080° C., and a density of 2.24. The $\log_{10}$ of its resistivity at 350° C. is 7.95. Its power factor is .0018 (expressed as a decimal—not as percent), its dielectric constant 4.8, and its loss factor .0086 (expressed as a decimal—not as percent).

Corning glass No. 772 is a soda-lead-borosilicate glass. It is designated H. R. clear "Nonex," laboratory No. G-702-P. It has a softening point at $755 \pm 5°$ C., an annealing point at 518° C., a strain point at 484° C., a coefficient of expansion of $36 \pm 1 \times 10^{-7}$ between 0 and 300° C., a working point at approximately 1110° C., and a density of 2.35. The $\log_{10}$ of its resistivity at 350° C. is 7.2, its power factor is .0027, (expressed as a decimal—not as percent), its dielectric constant 4.7, and its loss factor .0128 (expressed as a decimal—not as percent).

Corning glass No. 775 is a soda aluminum boroscilicate glass, differing from No. 774 by being lower in silica and higher in boric oxide. It is designated a clear sealing glass, laboratory No. G-705-R. It has a softening point at 704° C., an annealing point at 476° C., a strain point at 431° C., a coefficient of expansion of $$40.5 \pm 1.5 \times 10^{-7}$$

between 0 and 300° C., and a density of 2.19.

Corning glass No. 3320 is a soda-aluminum-borosilicate glass with a small percentage of uranium. It is designated as H. R. Canary and sold under the trade-mark "Pyrex," laboratory No. G-371 BN. It has a softening point at 780° C., an annealing point at 535° C., a strain point at 497° C., a coefficient of expansion of $40\pm1\times10^{-7}$ between 0 and 300° C., and a density of 2.29.

Corning glass No. 7052 is a potash-barium-borosilicate glass sold under the trade-mark "Pyrex," laboratory No. G-705-FN, for sealing purposes. It has a softening point at $708\pm5°$ C., an annealing point at 480° C., a strain point at 4420° C., a coefficient of expansion of $$46\pm1.5\times10^{-7}$$

between 0 and 300° C., a working point at approximately 1115° C., and a density of 2.29. The $\log_{10}$ of its resistivity at 350° C. is 7.40. Its power factor is .0026, (expressed as a decimal—not as percent), its dielectric constant 5.1, and its loss factor .0133, (expressed as a decimal—not as percent).

By employing my invention, it is possible to eliminate the use of all beading glass tubing and the operation of cutting such to the required length. The glass powder for the smoke is cheaply and conveniently provided by using scrap glass from cullet sealing, flare making, and other glass operations. Uniformity of quality can be readily specified and closely controlled, eliminating the personal element. The process, because of its flexibility lends itself readily to high speed production. Oxidizable articles, such as metal leads and other metal parts, may be coated with glass, in accordance with my invention, in a controlled or non-oxidizing atmosphere, thereby preventing undesired oxidation, and afterwards the glass film or coating thereon protects the metal from oxidation during subsequent heating operations.

Although preferred embodiments have been disclosed, it will be understood that modifications may be made within the spirit and scope of the invention.

I claim:

1. Apparatus for coating articles comprising means for generating a gaseous suspension of finely-divided glass powder having certain expansion characteristics, similar means for generating a gaseous suspension of finely-divided glass powder having different expansion characteristics, means for causing said gaseous suspensions to flow toward, and be mixed in a common conduit, and means for varying the proportions of the suspensions to change the mixture at will, and a nozzle at the end of said common conduit, so that the glass suspension emitted from said nozzle has characteristics, selectively controllable as desired.

2. The method of applying a firmly adherent graded coating of glass to a surface of an article, capable of withstanding fusion of glass thereon, adapting it to be united to an object having a coefficient of expansion different from that of said article, comprising blowing onto said surface a gaseous suspension of a composition consisting of two glasses as finely-divided particles, said glasses having different coefficients of expansion, the initial mixture of the glasses having a coefficient of expansion corresponding to that of the article and the final mixture having a coefficient of expansion corresponding to that of the object, charging the glass particles to a high potential relative to the article being coated as they move toward said article, thereby causing the glass particles to adhere to said surface, and during the blowing operation gradually changing the proportions of the particles of the two glasses from that of said initial mixture to that of said final mixture, and heating to fuse the adhering particles as a uniformly-varying graded coating on said surface.

3. The method of applying a firmly adherent graded coating of glass to a metal wire, capable of withstanding fusion of glass thereon, adapting it to be united to a glass envelope having a coefficient of expansion different from that of said wire, comprising blowing onto said wire a gaseous suspension of a composition consisting of two glasses as finely-divided particles, said glasses having different coefficients of expansion, the initial mixture of the glasses having a coefficient of expansion corresponding to that of the wire and the final mixture having a coefficient of expansion corresponding to that of the envelope, charging the glass particles to a high potential relative to the wire being coated as they move toward said wire, thereby causing the glass particles to adhere to said wire, and during the blowing operation gradually changing the proportions of the particles of the two glasses from that of said initial mixture to that of said final mixture, and heating to fuse the adhering particles as a uniformly-varying graded coating on said wire.

4. The method of applying a firmly adherent graded coating of glass to a front surface of a non-conductive article, capable of withstanding fusion of glass thereon, adapting it to be united to an object having a coefficient of expansion different from that of said article, comprising placing a conductive plate back of said article, blowing onto said surface a gaseous suspension of a composition consisting of two glasses as finely-divided particles, said glasses having different coefficients of expansion, the initial mixture of the glasses having a coefficient of expansion corresponding to that of the article and the final mixture having a coefficient of expansion corresponding to that of the object, charging the glass particles to a high potential relative to the plate as they move toward said article, thereby causing the glass particles to adhere to said surface, and during the blowing operation gradually changing the proportions of the particles of the two glasses from that of said initial mixture to that of said final mixture, and heating to fuse the adhering particles as a uniformly-varying graded coating on said surface.

5. The method of connecting first and second articles, both of which are capable of withstanding fusion of glass thereon and which have different coefficients of expansion, comprising blowing onto the surface of the first article a gaseous suspension of a composition consisting of two glasses as finely-divided particles, said glasses having different coefficients of expansion, the initial mixture of the glasses having a coefficient of expansion corresponding to that of the first article and the final mixture having a coefficient of expansion corresponding to that of the second article, charging the glass particles to a high potential relative to the article being coated as they move toward said article, thereby causing the glass particles to adhere to said surface, and during the blowing operation gradually changing the proportions of the particles of the two glasses from that of said initial mixture to that of said final mixture, heating to fuse the adhering particles as a uniformly-varying coating on said first article, and by fusion uniting the coated portion of said first article to said second article.

6. The method of connecting a metal wire to a glass envelope, both of which are capable of withstanding fusion of glass thereon and which have different coefficients of expansion, comprising blowing onto the surface of the wire a gaseous suspension of a composition consisting of two glasses as finely-divided particles, said glasses having different coefficients of expansion, the initial mixture of the glasses having a coefficient of expansion corresponding to that of the wire and the final mixture having a coefficient of expansion corresponding to that of the envelope, charging the glass particles to a high potential relative to the wire being coated as they move toward said wire, thereby causing the glass particles to adhere to said wire, and during the blowing operation gradually changing the proportions of the particles of the two glasses from that of said initial mixture to that of said final mixture, heating to fuse the adhering particles as a uniformly-varying coating on said wire, and by fusion uniting the coated portion of said wire to said envelope.

VERNON L. PLAGGE.

REFERENCES CITED

The following references are of record in the file of this patent:

UNITED STATES PATENTS

| Number | Name | Date |
| --- | --- | --- |
| Re. 22,419 | Smyser | Jan. 11, 1944 |
| 267,318 | Beach | Nov. 14, 1882 |
| 1,173,688 | Thomson | Feb. 29, 1916 |
| 1,566,911 | Nelson | Dec. 22, 1925 |
| 1,698,845 | Gustin | Jan. 15, 1929 |
| 1,774,694 | Bateman | Sept. 2, 1930 |
| 1,863,782 | Young | June 21, 1932 |
| 2,128,327 | Russell et al. | Aug. 30, 1938 |
| 2,220,742 | Thorson | Nov. 5, 1940 |
| 2,239,551 | Dalton | Apr. 22, 1941 |
| 2,271,125 | June | Jan. 27, 1942 |
| 2,334,648 | Ransburg | Nov. 16, 1943 |
| 2,424,353 | Essig | July 22, 1947 |
| 2,438,561 | Kearsley | Mar. 30, 1948 |